United States Patent [19]

Frost et al.

[11] Patent Number: 4,584,579
[45] Date of Patent: Apr. 22, 1986

[54] MEDIUM PRF PULSE DOPPLER RADAR PROCESSOR FOR DENSE TARGET ENVIRONMENTS

[75] Inventors: Edward L. Frost, Arnold; Leslie Lawrence, Columbia, both of Md.

[73] Assignee: The United States of America as represented by the Secretary of the Air Force, Washington, D.C.

[21] Appl. No.: 547,609

[22] Filed: Nov. 1, 1983

[51] Int. Cl.$^4$ ............................................. G01S 7/28
[52] U.S. Cl. ............................................. 343/17.1 R
[58] Field of Search ............... 343/5 DP, 7.7, 7 A, 343/17.1 PF, 17.1 R; 364/728; 340/146.2

[56] References Cited

U.S. PATENT DOCUMENTS 4,095,222  6/1985  Mooney, Jr. ................ 343/7 A
4,377,811  3/1985  Mooney, Jr. et al. ........ 343/7 A Primary Examiner—T. H. Tubbesing
Assistant Examiner—Donald Hayes
Attorney, Agent, or Firm—Donald J. Singer; Bernard E. Franz

[57] ABSTRACT

This invention is a modification to the ABC range correlators of U.S. Pat. No. 4,095,222 to Mooney, Jr., used in medium PRF radars. It extends the functioning of the range correlators to not only derive target unambiguous range while suppressing detections of clutter discretes but also to reduce the occurrence of false target reports (range ghosts) and blanking of true targets that would otherwise occur when the radar is operated in dense target environments. The specific point of novelty in this design is the operation of two sets of correlators, designated ABC and A'B'C', each with a different M of N detection criterion.

3 Claims, 3 Drawing Figures

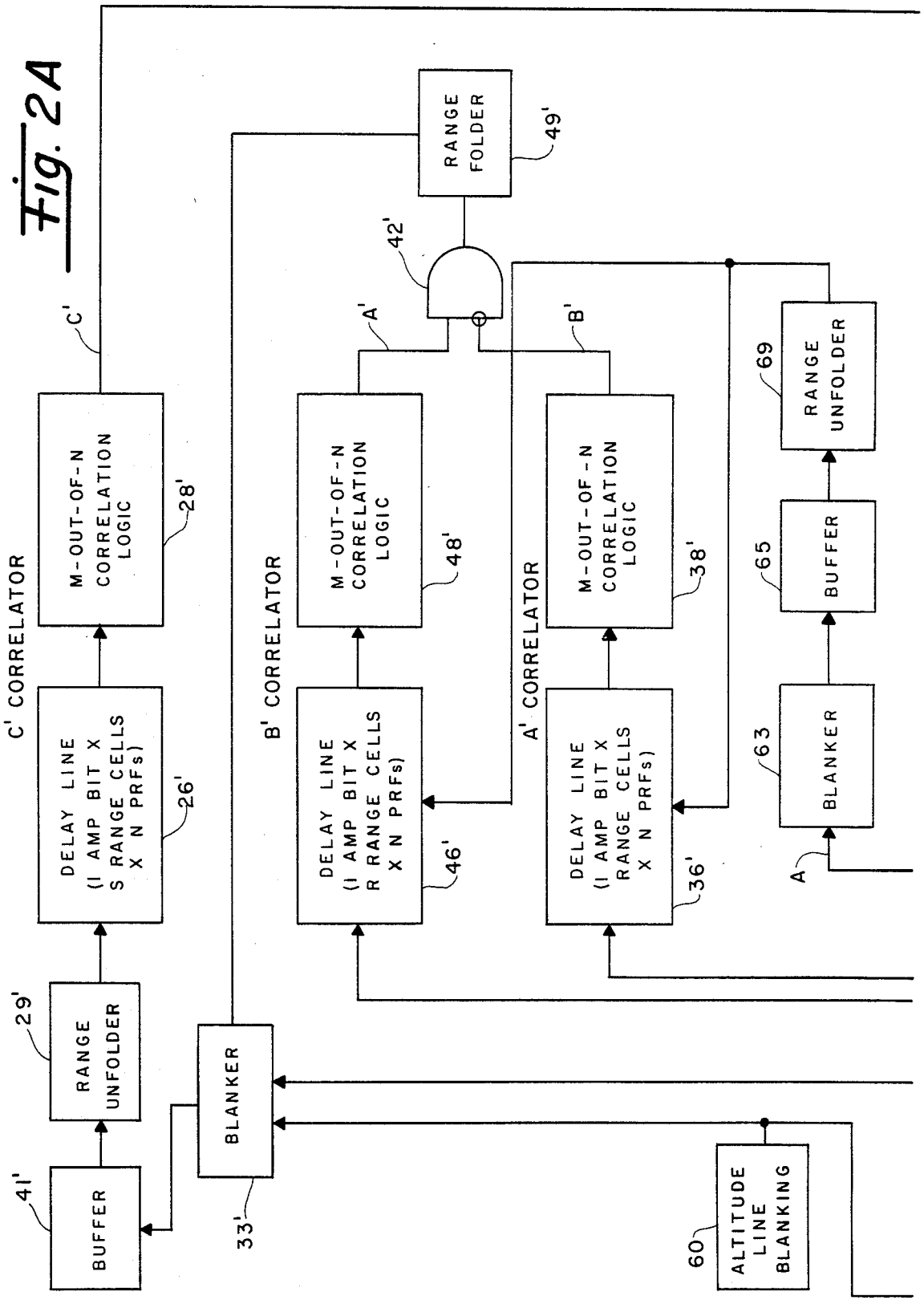

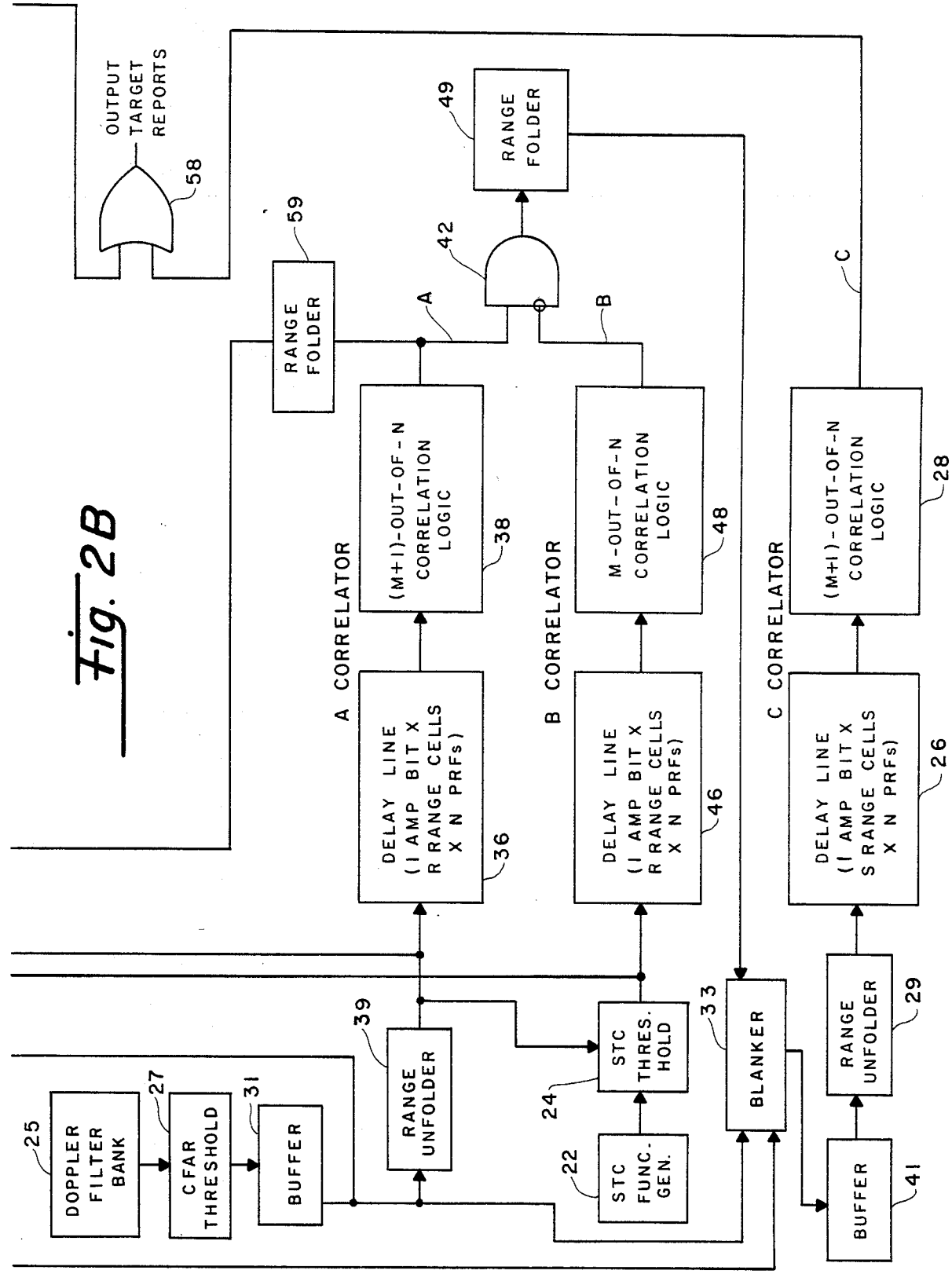

MEDIUM PRF PULSE DOPPLER RADAR PROCESSOR FOR DENSE TARGET ENVIRONMENTS

RIGHTS OF THE GOVERNMENT

There is reserved to the Government of the United States a nonexclusive, irrevocable, royalty-free license in the invention described herein with power to grant licenses for all governmental purposes.

BACKGROUND OF THE INVENTION

This invention relates to an improved system for post-detection processing of information in radar receivers.

Heretofore, a single channel medium PRF pulse doppler radar receiver was proposed that effectively prevented sidelobe return signals from being displayed as "ghost" or "false" targets. In such system, the received signal data is preliminarily processed by a filter bank and a CFAR (constant false alarm) threshold circuit to remove main-beam clutter and area sidelobe clutter returns. The preliminarily processed data is then temporarily stored, as two parallel correlations are performed on a range call by range cell basis to identify range cells which contain discrete sidelobe clutter return signals. One of the parallel correlations is performed on the data after it is passed through a sensitivity time control threshold circuit, and the other parallel correlation is performed on the raw data. The outputs of the parallel correlators are then compared. The identified range cell correlations in the raw data correlator are compared with corresponding range cells of the sensitivity time control correlations to idenfity range cell numbers which contain discrete sidelobe clutter return signals. Identified range cell numbers are then blanked from the raw data before it is correlated for a third time. The output of the third correlator identifies the true target return signals and the corresponding unambiguous range thereof.

Although such a system, which is described in detail in U.S. Pat. No. 4,095,222 entitled "Post-Detection STC In A medium PRF Pulse Dopper Radar" issued June 13, 1978, to Mooney, Jr., operates effectively and satisfactorily, the operation of the ABC Correlators degrades when the radar is operated in a dense target environment with mutiple targets visible during the processing dwell. Large numbers of range ghosts are generated by targets cross correlating with one another. Some of these ghosts are removed by (A and not B) blanking when they are produced at short ranges (within the STC range) by targets out at long ranges. Unfortunately, since the blanking is performed ambiguously in range, the real targets that produce these ghosts are also blanked out. The result is that significant numbers of range ghosts are reported while true targets with ample S/N are blanked.

SUMMARY OF THE INVENTION

An object of the invention is to improve the performance of a single channel medium PRF pulse doppler radar receiver in a dense target environment.

In the processing apparatus according to the invention, two sets of three correlators each are used. A first correlation is performed with an M+1 of N criterion to provide a signal A. Second and third correlations are performed as in U.S. Pat. No. 4,095,222 to provide signals B and C, using M of N criterion in the second correlation for signal B and M+1 of N criterion in the third correlation for signal C. Using the output A of the first correlation, all successful correlations are then blanked ambiguously in range from the previous N looks in a fourth correlation to form a reduced data set designated A'. Most targets have been removed from the A' data thus reducing the chances of cross correlations in A'. The fourth correlation works with a fifth correlation (as the first correlation works with the second correlation) using an M of N criterion to generate blanking vectors for a sixth correlation providing a signal C'. The target report signals C and C' from the third and sixth correlations are combined via OR logic to form the final target report.

The net result is that (A and not B) and (A' and not B') processing has reduced the blanking of true targets while C and C' processing removes the range ghosts.

BRIEF DESCRIPTION OF THE DRAWING

FIGS. 2A and 2B comprise is a more detailed block diagram.

DETAILED DESCRIPTION

Figure 1:
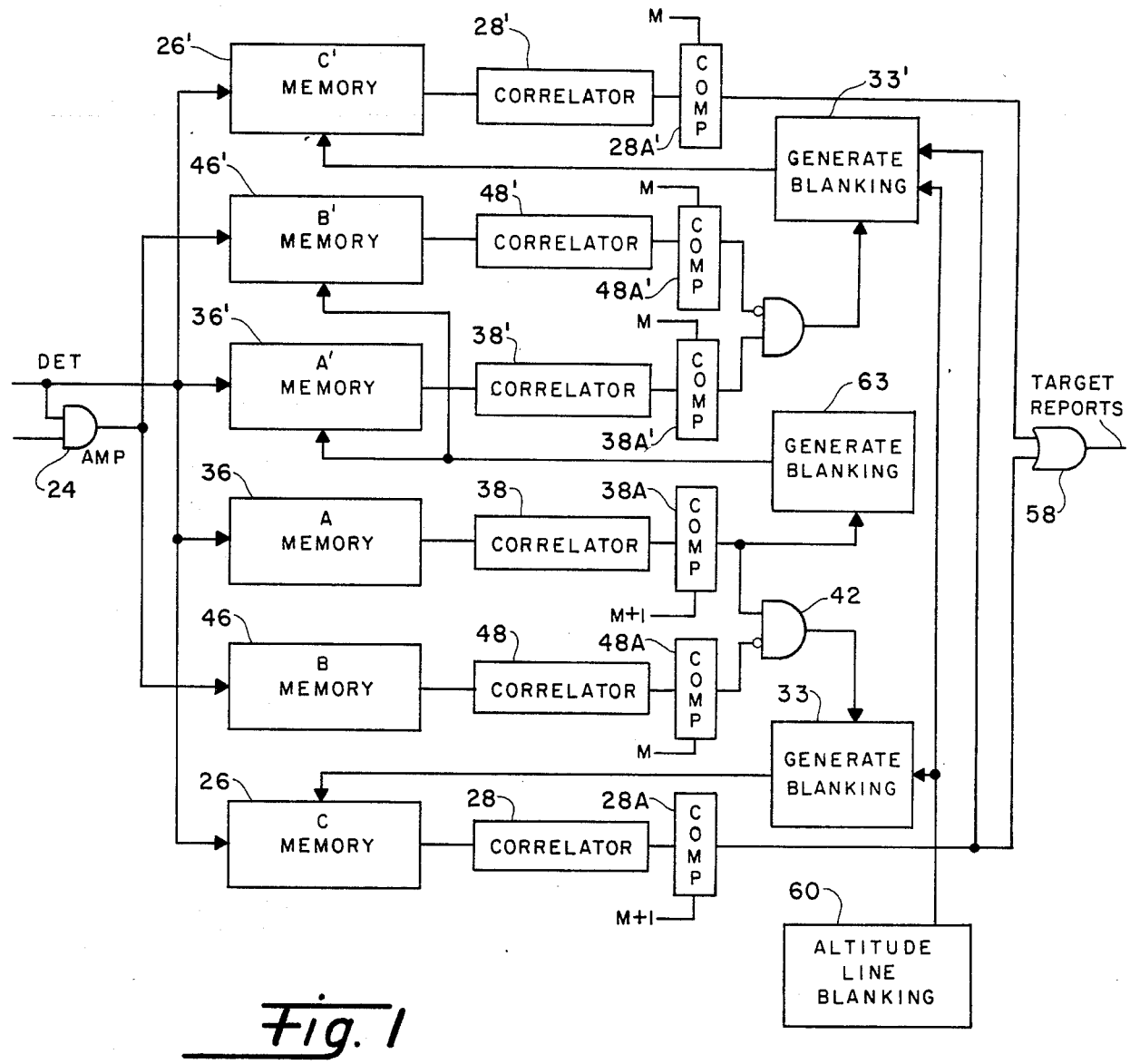
FIG. 1 is a block diagram of a post-detection processor according to the invention.

The range ambiguity of Medium PRF radars has been resolved through the use of multiple PRF's within the target dwell and subsequent processing in a range correlator. The range correlator operates on the detection data by first unfolding in range the range gate detections in each PRF out to the limit of unambiguous range processing. If the PRF set has been selected with care (i.e., relatively prime RGIPP's, etc.) then the simultaneous occurrence of range gate detections in at least M of the N PRF's will occur only at the range gate corresponding to the unambiguous target range. The ABC correlator design (U.S. Pat. No. 4,095,222) improve upon this basic scheme by employing a post processing STC function in the correlation process. The generation of a target report requires satisfying both the M of N criterion in the A correlator and an M of N criterion in the B correlator where the amplitudes of each detection are compared to the STC thresholds. When the M of N criterion is satisfied in the A correlator but not in the B correlator, the detection history for that range gate is blanked out ambiguously in range for all N looks in the C correlator, which initially contains the same range gate detection history as the A correlator. Target reports are generated for those gates that meet the M of N requirement in the C correlator after the (A and not B) blanking has been applied. This mechanization has been successful in suppressing the reporting of clutter discretes and range ghosts generated by cross correlations between clutter detections.

The operation of the ABC Correlators degrades when the radar is operated in a dense target environment with multiple targets visible during the processing dwell. Large members of range ghosts are generated by targets cross correlating with one another. Some of these ghosts are removed by (A and not B) blanking when they are produced at short ranges (within the STC range) by targets out at long ranges. Unfortunately, since the blanking is performed ambiguously in range, the real targets that produced these ghosts are also blanked out. The result is that signficant numbers of range ghosts are reported while true targets with ample S/N are blanked.

This invention remedies this situation by exploiting the fact that the average target PRF visibility exceeds the M of N criterion while most range ghosts only meet it. Two sets of ABC correlators are used, as shown in FIG. 1. An A correlation is performed with an M+1 of N criterion. All successful correlations are then blanked ambiguously in range from the previous N looks to form a reduced data set designated A'. Correlation is then performed with an M of N criterion in A'. Most targets have been removed from the A' data thus reducing the chance of cross correlations in A'. Few range ghosts survive the M+1 criterion in the A correlator. Both the A and A' correlators work with a B correlation using an M or N criterion to generate blanking vectors for the final C and C' correlations. The C correlator uses an M+1 of N criterion after (A and not B) blanking and altitude line blanking have been applied. Surviving correlations are then blanked from the data set in the previous N looks to form the reduced data set designated C'. Finally, M of N correlation is performed for the C' correlator. The target reports for the C and C' correlators are ORed to form the final target report. The net result is that (A and not B) and (A' and not B') processing has reduced the blanking of true targets while C and C' processing removes the range ghosts. Note that targets that are visible in only M PRF's get reported out of the C' correlator.

Best results are obtained when the M of N processing in the (A' and not B') correlators lags the M+1 of N processing in the (A and not B) and C correlators by one look. This eliminates the false reports the C' correlator would otherwise generate for the situation depicted in Table I.

The upper half of Table I shows the case without the one look lag. Target A does not meet a 4 of N criterion in range gate k and is not reported. Range gate L has a ghost formed by correlation of target A, B and C even though range gate L may not be their true range. If the target report is delayed one look, a 4 of N correlation in C is possible as shown in the lower half of Table I. This correlation results in a blanking of target A before the 3 of N correlation in C' is made, hence no ghost is reported.

Computer simulations of ABC And ABC+A'B'C' processing have shown the improvements in blanking and ghosting that can be realized in multiple target environments. Table II lists the simulation results for a typical medium PRF system. Dramatic improvements are obtained for densities of up to 4 or 5 targets/dwell. The efficiency of this design decreases as the number of targets/dwell exceeds about 6, as a greater proportion of the range ghosts are becoming M+1 visible and therefore cannot be removed. However, performance of this new design is still significantly better than the current ABC correlators even at these higher target densities.

TABLE I

| Look History | Range Gate No. | | | | | | | | | | |
|---|---|---|---|---|---|---|---|---|---|---|---|
| L | K−2 | K−1 | K | K+1 | K+2 | L−2 | L−1 | L | L+1 | L+2 | |
| O | O | O | \|O\| | O | O | O | O | \|O\| | O | O | Ghost |
| O H | O | O | \|O\| | O | O | O | O | \|O\| | O | O | report this |
| K I | O | O | \|O\| | O | O | O | O | \|O\| | O | O | look blanked |
| S | O | O | \|O\| | O | O | O | O | \|O\| | O | O | on next look |
| T | O | O | \|A\| | O | O | O | O | \|B\| | O | O | |
| O | O | O | \|A\| | O | O | O | O | \|A\| | O | O | |
| R | O | O | \|A\| | O | O | O | O | \|C\| | O | O | |
| Y | O | O | \|A\| | O | O | O | O | \|O\| | O | O | |

Target A in RG K of C Correlator

Ghost in RG L of C' Correlator (Formed from Targets) A, B, and C.

| K−2 | K−1 | K | K+1 | K+2 | L−2 | L−1 | L | L+1 | L+2 | |
|---|---|---|---|---|---|---|---|---|---|---|
| O | O | \|O\| | O | O | O | O | \|O\| | O | O | No ghost |
| O | O | \|O\| | O | O | O | O | \|O\| | O | O | reported |
| O | O | \|O\| | O | O | O | O | \|O\| | O | O | |
| O | O | \|O\| | O | O | O | O | \|O\| | O | O | |
| O | O | \|A\| | O | O | O | O | \|B\| | O | O | |
| O | O | \|A\| | O | O | O | O | \|O\| | O | O | |
| O | O | \|A\| | O | O | O | O | \|C\| | O | O | |
| O | O | \|A\| | O | O | O | O | \|O\| | O | O | |

Target in RG K of C Correlator

RG L of C' Correlator

TABLE II

| | 4 Targets/Dwell | | 8 Targets/Dwell | |
|---|---|---|---|---|
| | Avg. Number of Ghosts | Avg. Number of Blanked Targets | Avg. Number ghosts | Avg. Number Blanked Targets |
| ABC Correlators | 1.08 | .88 | 2.56 | 3.74 |
| ABC + A'B'C' Correlators | 0.12 | .38 | 1.15 | 1.07 |

One large discrete plus Altitude Line Blanking of 2 ambiguous gates is assuemd in Table II.

FIGS. 2A and 2B comprise is a more complete block diagram of the present invention, which includes the ABC correlation system shown in FIG. 4 of U.S. Pat. No. 4,095,222 (incorporated by reference and hereafter called the ABC patent), and described therein. It may be helpful to repeat the description in abbreviated form.

In a single channel medium PRF pulse doppler-type radar receiver, the signals of the coherent receiver (not shown) are applied to the doppler filter bank 25 which removes signals having the predicted doppler shift of the background of the main beam to remove main beam clutter signals from the received signals. The CFAR threshold circuit 27, which is responsive to the doppler filter bank 25, provides a constant false alarm threshold signal which is responsive to the level of intensity of the area sidelobe clutter. The digital information from the CFAR circuit of the receiver is received in a detection buffer 31. The information is temporarily stored in the detection buffer 31 and indicates the amplitude of the received signals and the ambiguous range cells being occupied of each PRF.

A range unfolded circuit 39 receives the amplitude and ambiguous range data from the detection buffer 31 and, for each PRF, unfolds the data in R range cell numbers. See the ABC patent for more detail.

The output of range unfolder 39 is fed in parallel to A and B correlators which, together with the range unfolder 39, STC (sensitivity time control) function generator 22, STC threshold comparator 24, and comparator 42, comprise a means for detecting the occurrence of discrete sidelobe clutter returns in the STC range unfolder 39. The A correlator directly receives the information from the range unfolder 39 in delay line 36. The delay line 36 (A memory) is comprised of a shift register memory with an address for each range cell and each unambiguous PRF range signal. The delay line 36 has a dimensional capacity of 1 amplitude bit by R range cells by N PRF's. One amplitude bit indicates the state of the signals fed into the delay line 36 wherein "O" indicates no detection and a "1" indicates a signal detection. The number of range cells R in the delay line 36 corresponds to the number of range cells within the maximum range of the STC threshold function employed in the B correlator. The N PRF's may be three or more, and typically 6 to 8 in number.

Simultaneously, the data output from the range unfolder 39 is fed to a STC threshold circuit 24, controlled by the STC function generator 22. The STC threshold circuit 24 compared the unfolded, unambiguous range signal of each PRF with the STC level to determine whether a signal occurring in a particular range cell of the unfolded range signal represents a discrete sidelobe clutter. The data exceeding the STC threshold is passed to the delay line 46 (B memory) of the B correlator.

The delay line 46 of the line B correlator is identical to delay line 36 of the A correlator. The correlation logic circuits 38 and 48 respectively correlate the data in the corresponding R range cells in the delay lines 36 and 46. The correlation logic circuits 38 and 48 each include a summing network and a comparator such that the summing network adds the output provided by the shift register memory of the delay lines 36 and 46 respectively for each range cell and provides a signal representing the summation to the comparator. When the comparator determines that the signal provided by the summing network exceeds a predetermined value which would indicate correlation among a sufficient number of the unambiguous range signals in a particular range cell, the comparator determines that there is a correlation between concurrently accessed addresses representing range cells in each of the unambiguous PRF range signals and provides a correlation signal to the logic circuit 42 which signal is a "1" if there is correlation, and "0" if there is not. The output of the A correlator is compared with the output of the B correlator for each of the R unambiguous range cells. Logic circuit 42 produces a range cell number indication whenever the A correlator produces a signal of "1" and the B correlator produces a signal of "0+ for any particular unambiguous range cell.

A range folder 49 converts the true range cell number (corresponding to an identified clutter discrete) into a form suitable to control the data blanker 33. This is accomplished by a divider circuit which divides the true range cell number by the number of gates per interpulse period (for each PRF, in turn) and outputting the remainder of "modulo". That is, the range folder 49 folds the output of the comparator, of logic circuit 42, into a predetermined number of range cells, in accordance with the interpulse period of the respective PRF, to provide an ambiguous PRF discrete signal to the data blanker 33. This corresponds to the inverse operation of the range unfolder 39. The folding means, i.e., the range folder 49, includes a random access memory and a modulo range counter for each PRF of the radar. The random access memory provides a memory address for each range cell of each unambiguous PRF discrete signal and the addresses associated with each unambiguous PRF discrete signal are successively accessed by the modulo range counter associated with the corresponding unambiguous PRF range signal to store the ambiguous PRF discrete signals in the random access memory.

The ambiguous range gate number is then employed to blank out data received in the data blanker 33, which includes an inverter and an "AND" gate from the detection buffer 31 in that corresponding ambiguous range cell number. The buffer 41 receives the data from the data blanker 33 for each ambiguous range cell, except those which are blanked. The information is then fed to a means for determining the range of the target from the target returns provided by the data blanker which means includes the C correlator and a range unfolder 29 which assigns the data from the buffer 41 to unambiguous range cells for each PRF. The range unfolder 29 is similar to the range unfolder 39 and performs the same unfolding operation on the ambiguous PRF signals received from the second buffer 41 as the range unfolder 39 performs on the ambiguous PRF signals received from the detection buffer 31. The C correlator which includes a delay line 26 comprised of a shift register memory and a correlation logic circuit 28 comprised of a summing network and a comparator corresponds to the correlator section shown in FIG. 2 of the ABC patent, and has a dimension of 1 amplitude bit by S range cells by N PRF's. The correlation logic 28 then determines the number of occurrences M in corresponding range cells of the N PRF's. Typically, M is 3 and may be increased in areas of heavy discrete sidelobe clutter. However, an increase in M is necessarily met with a lower degree of sensitivity to the true target, since a large number of correlations are necessary in order to indicate a true target return.

The A', B' and C' correlates operate in a manner similar to the A, B and C correlators respectively. The A' memory 36' has its principal input from the range unfolder 39 in parallel with the input to the A memory 36. The output A from the correlation logic 38 is supplied via a range folder 59, a data blanker 63, a buffer 65, and a range unfolder 69 to provide blanking in the A' memory to form the reduced data set.

The principal input to the B' memory 46' is supplied from the STC threshold circuit 24 in parallel with the input to the B memory 46. The blanking signal from range unfolder 69 is also applied to the B' memory to form a reduced data set. The signals A' and B' from the correlation logic units 48' and 38' are inputs to the logic circuit 42' which provides the (A' and not B') signal.

This is supplied via a range folder 49', a blanker 33', a buffer 41' and a range unfolder 29' to the C' memory 26'. These circuits operate in the same manner as the corresponding circuits 49, 33, 41, and 29 in the ABC correlation circuits. The outputs C and C' form the correlation logic units 28 and 28' are then ORed via gate 58 to provide the output target returns.

While preferred constructional features of the invention are embodied in the structure illustrated herein, it is to be understood that changes and variations may be made by the skilled in the art without departing from the spirit and scope of my invention.

We claim:

1. In a single channel radar receiver responsive to return signals that include discrete sidelobe clutter returns, and having first correlator means for correlating the returns with an (M+1)-out-of N comparison to provide a first correlation signal A, means for thresholding the returns over a predetermined period of time, second correlator means for correlating such thresholded return with an M-out-of-N comparison to provide a second correlation signal B, first logic means using the first and second correlation signals A and B to provide a signal used to detect and blank the discrete sidelobe returns, and having third correlator means to correlate the blanked returns with an (M+1)-out-of-N comparison over a predetermined number of range cells to provide a third correlation signal C indicative of the unambiguous range of any target return signals;

fourth correlator means for correlating the returns with an M-out-of-N comparison to provide a fourth correlation signal A', fifth correlator means for correlating said thresholded return with an M-out-of-N comparison to provide a fifth correlation signal B', means using said third correlation signal A to provide blanking to said fourth and fifth correlation means, second logic means using the fourth and fifth correlation signals A' and B' to provide a signal used to detect and blank the discrete sidelobe returns, and having sixth correlations means to correlate the blanked returns with an M-out-of-N comparison over a predetermined number of range cells to provide a sixth correlation signal C' indicative of the unambiguous range of any target return signals;

and OR gate means having inputs of the third and sixth correlation logic signals C and C' and an output for target reports.

2. Apparatus according to claim 1, wherein said first logic means provides an (A and not B) output signal, and said second logic means provides an (A' and not B') output signal.

3. Apparatus according to claim 2, including means such that the M of N processing in the fifth and sixth correlator means lags the M+1 of N processing in the first and second correlator means by one look.

* * * * *